United States Patent
Hagen et al.

(10) Patent No.: US 8,582,700 B2
(45) Date of Patent: Nov. 12, 2013

(54) REDUCING SWITCHING NOISE (75) Inventors: Derek Hagen, Ytterby (SE); Vimar Bjork, Goteborg (SE); Claes Rolen, Uddevalla (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 258 days.

(21) Appl. No.: 13/202,847

(22) PCT Filed: Feb. 22, 2010

(86) PCT No.: PCT/EP2010/052191
§ 371 (c)(1),
(2), (4) Date: Aug. 23, 2011

(87) PCT Pub. No.: WO2010/097359
PCT Pub. Date: Sep. 2, 2010

(65) Prior Publication Data
US 2011/0305305 A1    Dec. 15, 2011

Related U.S. Application Data (60) Provisional application No. 61/155,671, filed on Feb. 26, 2009.

(51) Int. Cl.
*H04L 27/08* (2006.01)
(52) U.S. Cl.
USPC ............ 375/345; 375/316; 375/346; 375/348

(58) Field of Classification Search
USPC .................... 375/316, 345, 346, 348
See application file for complete search history.

(56) References Cited

U.S. PATENT DOCUMENTS

| | | | |
|---|---|---|---|
| 7,474,883 B2 * | 1/2009 | Rudberg | 455/234.2 |
| 7,848,706 B2 * | 12/2010 | Vilzmann et al. | 455/63.1 |
| 8,295,371 B2 * | 10/2012 | Rick et al. | 375/260 |
| 2003/0064695 A1 | 4/2003 | Shi | |
| 2007/0049227 A1 | 3/2007 | Su | |
| 2008/0279393 A1 | 11/2008 | Saito et al. | |

FOREIGN PATENT DOCUMENTS

| | | |
|---|---|---|
| EP | 1306977 A2 | 5/2003 |
| EP | 1326347 A2 | 7/2003 |
| EP | 1638211 A1 | 3/2006 |
| EP | 2015461 A2 | 1/2009 |
| WO | 2007122188 A1 | 11/2007 |

* cited by examiner

*Primary Examiner* — Ted Wang
(74) *Attorney, Agent, or Firm* — Rothwell, Figg, Ernst & Manbeck, P.C.

(57) ABSTRACT

The present solution relates to a method in a first communication node (501) for suppressing noise in a communication system (500) utilizing an automatic gain control. The first communication node (501) receives (1301) a signal from a second communication node (503). Then, the first communication node (501) determines (1302) if a gain level is changed. The signal gain is changed (1303). The next step is for the first communication node (501) to determine (1305) if an inband interferer is present, and then to suppress (1306) transient noise in the signal.

11 Claims, 14 Drawing Sheets

REDUCING SWITCHING NOISE

CROSS-REFERENCE TO RELATED APPLICATION

This application is a 35 U.S.C. §371 National Phase Entry Application from International Application No. PCT/EP2010/052191, filed Feb. 22, 2010, and designating the United States, and which claims priority to U.S. Patent Application No. 61/155,671, filed on Feb. 26, 2009, the disclosure of which is incorporated by reference herein in its entirety.

TECHNICAL FIELD

This invention relates generally to a method and a communication node. More particularly this invention relates to a method and communication node for reducing noise in a communication system utilizing an automatic gain control.

BACKGROUND

Figure 1:
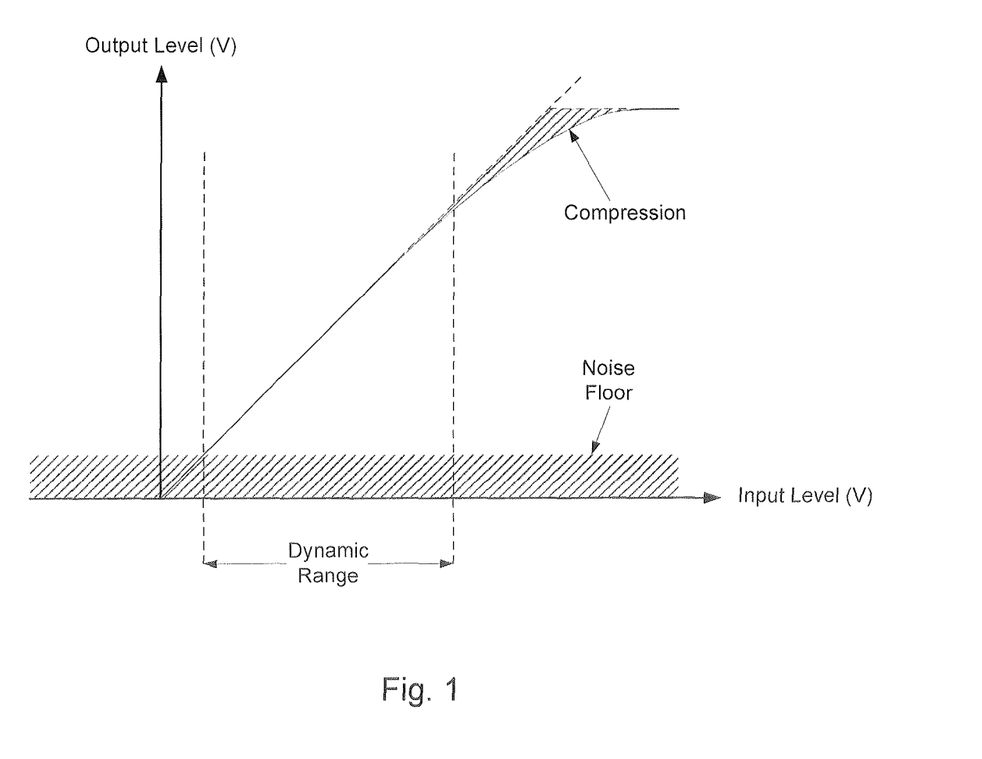
FIG. 1 is a graph illustrating characteristics of an example of a dynamic range limited device.
Figure 2:
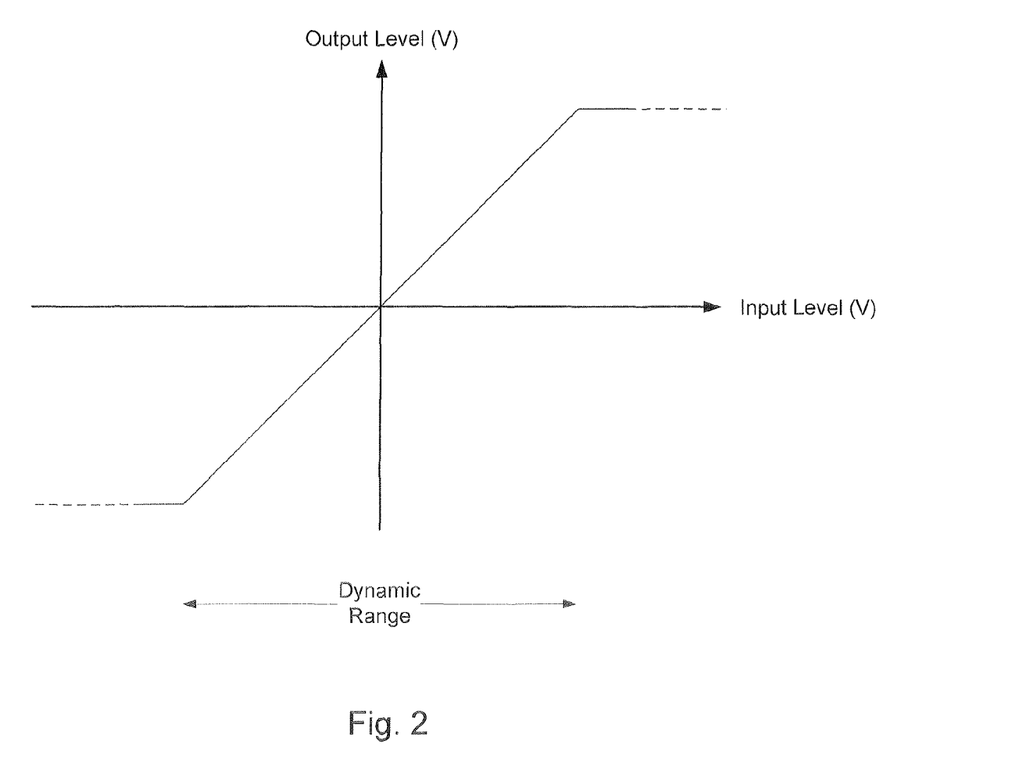
FIG. 2 is a graph illustrating characteristics of an example of a dynamic range limited device.
Figure 3:
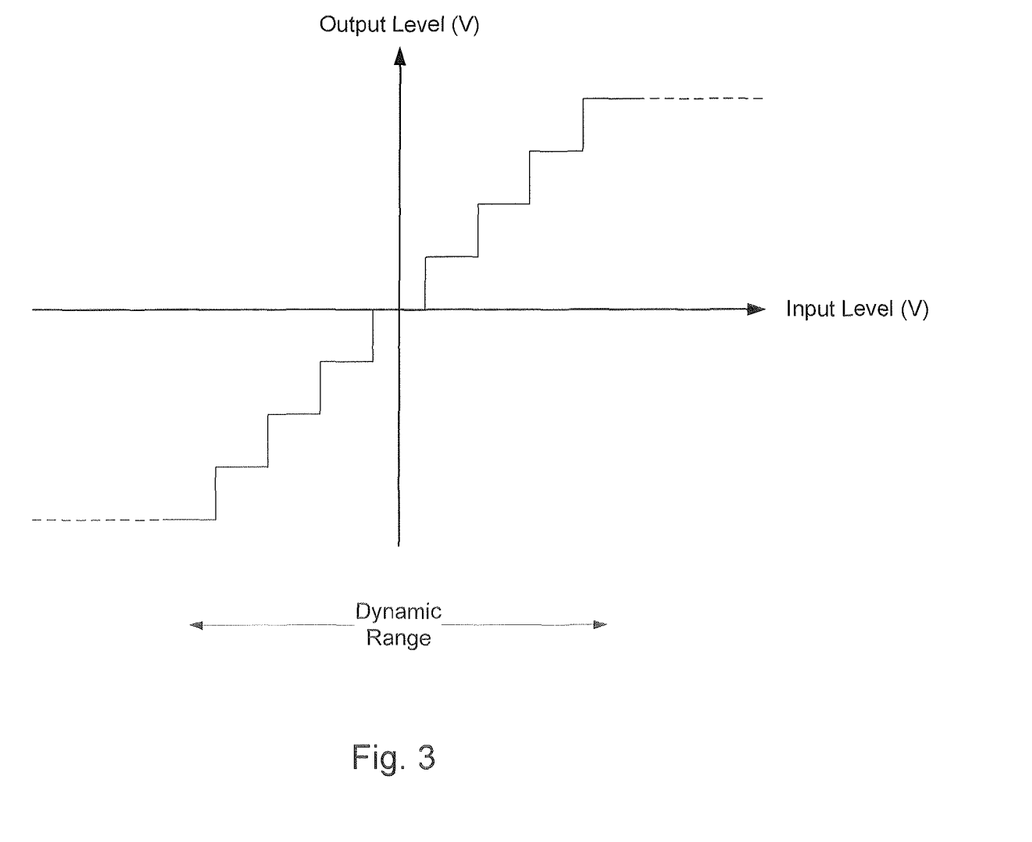
FIG. 3 is a graph illustrating characteristics of an example of a dynamic range limited device.

For receivers in radio communication systems, it is important to control the dynamic range of the signals at each processing stage in the receiver. High performance receiver designs utilize Automatic Gain Control (AGC) to tune the gain distribution, so the total received signal does not saturate at any stage in the receiver chain. Examples of devices that impact on the dynamic range are nonlinear amplifiers, limiting amplifiers, and Analogue-to-Digital (A/D)-Digital-to-Analogue (D/A) converters etc. FIG. 1 illustrates an example of a nonlinear amplifier. The characteristics seen in the figure are caused by noise floor and gain compression. FIG. 2 illustrates an example of a limiting amplifier where the characteristics seen are caused by limited output. FIG. 3 illustrates the dynamic range limited device characteristic of an A/D-D/A Converter.

Figure 4:
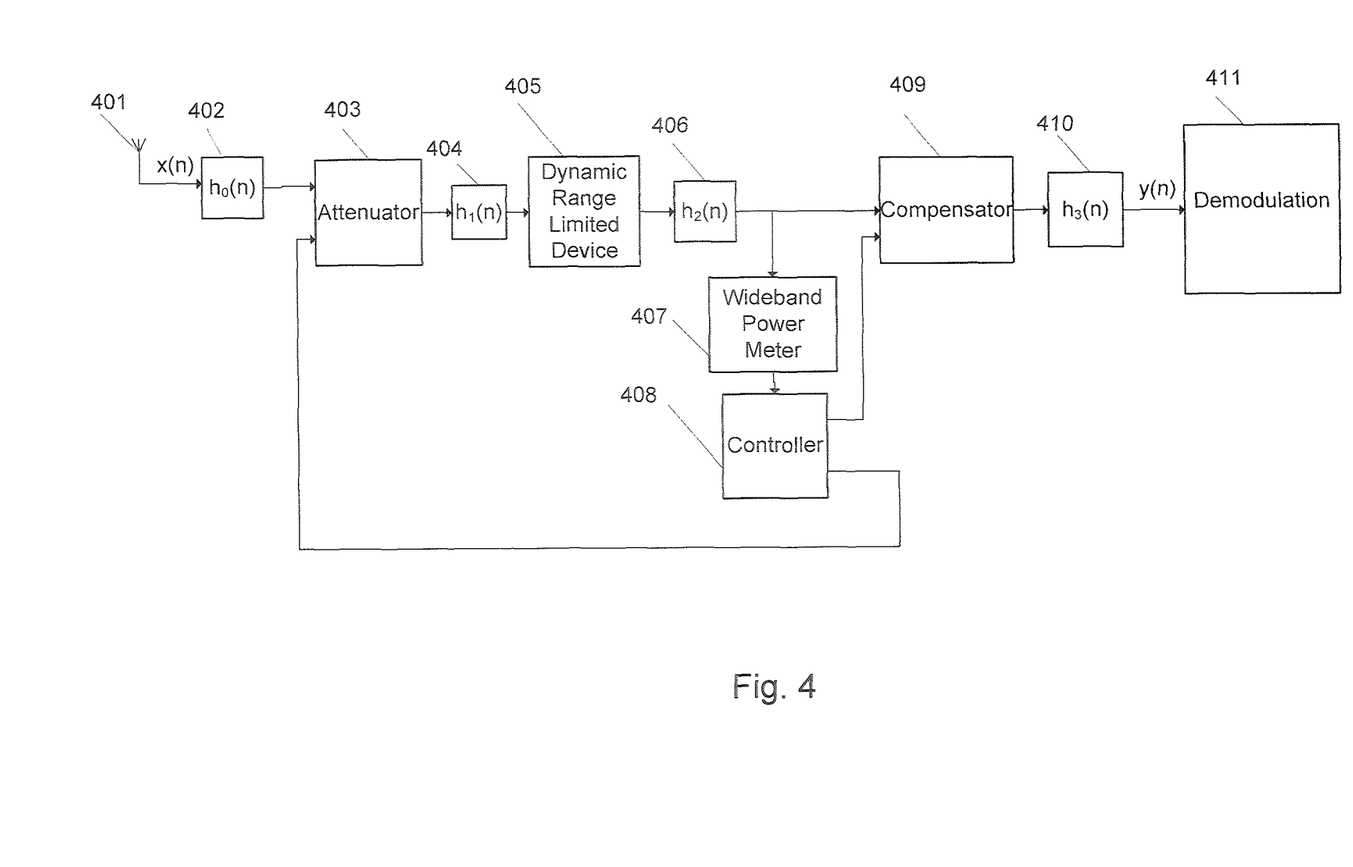
FIG. 4 is a block diagram illustrating an example of an AGC receiver architecture.

FIG. 4 is a block diagram illustrating an example of an AGC receiver architecture. An input signal x(n) is received via the antenna 401, which goes through a receiver antenna filter $h_0(n)$ 402. An attenuator 403 adjusts the input signal and waits for a discontinuity to propagate. The adjusted signal proceeds through a band pass filter $h_1(n)$ 404, and then through a dynamic range limited device 405. Examples of dynamic range limited devices 405 are described above in relation to FIGS. 1, 2, and 3 above. The signal is processed through an anti alias filter $h_2(n)$ 406, before it is treated in a wideband power meter 407, where the wideband signal level is measured. The measured signal level is controlled by a controller 408 to determine if the signal is acceptable with regards to a threshold and/or range. If the signal is not acceptable, it is transmitted back to the attenuator 403. If the signal is acceptable, it is transmitted to a compensator 409, where the controlled signal together with the signal from the anti alias filter $h_2(n)$ 406 is processed. The compensator 409 changes the signal gain based on the controlled range. The compensated signal is transmitted through the channel filter $h_3(n)$, and the output signal y(n) is processed in a demodulator 411 to extract the original information bearing signal from the processed signal y(n).

Tuning or switching the gain at any processing stage, during the receipt of a continuous signal, may add discontinuity to the received signal. When the discontinuous signal is processed in the subsequent stages, depending on the processing algorithms of these stages, the discontinuity may add noise to the signal and also widen the spectrum of the received signal. The problem is increasing when a small wanted signal is received at the same time as a large interferer is received at a frequency which is close to the wanted signal frequency. In this case, the spectrum widening of the large unwanted signal may add a significant amount of noise and interference to the wanted signal. Such a noise pulse and distortion may cause estimation error in the demodulation process and ruin the interpreted symbol.

SUMMARY

It is thus an object of the present invention to provide improved signal quality in a communication system.

According to a first aspect of the present solution, the objective is achieved by a method in a first communication node for reducing noise in a communication system utilizing an automatic gain control. At first, the first communication node receives a signal from a second communication node. Then, it is determined if a gain level in the received signal is changed. The signal gain is changed. The next step is to determine if an inband interferer is present before transient noise in the signal is suppressed.

According to a second aspect of the present solution, the objective is achieved by a receiver in a first communication node for reducing switching noise in a communication system utilizing an automatic gain control. The receiver comprises a receiving unit configured to receive a signal from a second communication node.

The receiver further comprises a determining unit which is configured to determine if a gain level in the received signal is changed. The determining unit is further configured to determine if an inband interferer is present.

The receiver comprises a changing unit configured to change the signal gain.

Further, the receiver comprises a suppression unit which is configured to suppress transient noise in the signal.

According to a third aspect of the present solution, the objective is achieved by a communication system for reducing switching noise utilizing an automatic gain control. The system comprises a first communication node comprising an antenna configured to receive a signal from a second communication node.

The system further comprises a receiver which is configured to suppress transient noise.

The system also comprises a demodulator configured to demodulate the signal.

Further, the system comprises a memory configured to store the demodulated signal.

The system also comprises a transmitter which is configured to transmit the demodulated signal.

Thanks to suppression of the switching noise by exchanging the noise pulse in the signal with zeroes, the signal quality of the communication system is improved.

The present technology affords many advantages, for which a non-exhaustive list of examples follows:

The device reduces the probability for the demodulator of detecting erroneous symbols due to AGC switching noise and attenuator-compensator mismatch.

Another advantage of the present solution is that the signal treated in the demodulation process has no estimation errors which give a correct interpretation of the signal.

The present invention is not limited to the features and advantages mentioned above. A person skilled in the art will recognize additional features and advantages upon reading the following detailed description.

BRIEF DESCRIPTION OF THE DRAWINGS

The invention will now be further described in more detail in the following detailed description by reference to the appended drawings illustrating embodiments of the invention and in which.

The drawings are not necessarily to scale, emphasize is instead being placed upon illustrating the principle of the invention.

DETAILED DESCRIPTION

The present solution is related to a receiver with automatic gain control which continuously adjusts the receiver gain, moving the input signal into the dynamic range. When an adjustment in an attenuator unit occurs, the device waits for the discontinuity to propagate, first to a compensator unit and a channel filter, then to a suppression unit, where it suppresses the switching noise by exchanging the noise pulse in the signal with zeroes. The suppression only is applied if the wanted signal exceeds a threshold level.

Figure 5:
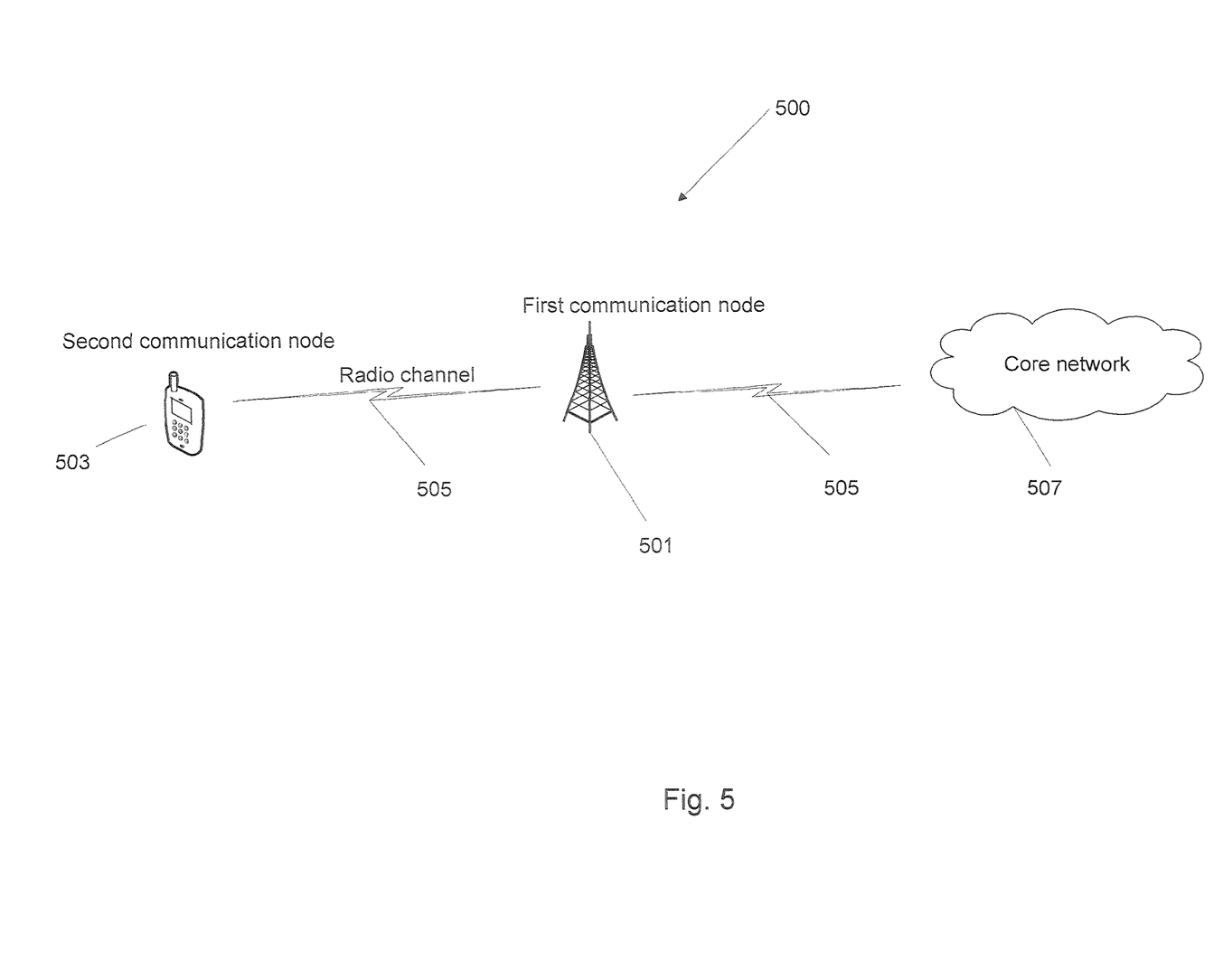
FIG. 5 is a schematic block diagram illustrating embodiments of a communication network.

FIG. 5 is a schematic block diagram illustrating embodiments of a communication network 500. The network may use technologies such as e.g. LTE, UMTS or GSM etc. The network 500 comprises at least one first communication node 501 and at least one second communication node 503. The first communication node 501 may be e.g. a base station, eNodeB, etc. The second communication node 503 may be any suitable communication device or computational device with communication capabilities, for instance but not limited to user equipment, mobile phone, smart phone, personal digital assistant (PDA), laptop, MP3 player, portable DVD player or similar media content devices, digital camera, or even stationary devices such as a PC. The first communication node 501 and the second communication node 503 communicates with each other using any suitable kind of wired (not shown) or wireless communication link 505. The communication link 505 may use any suitable protocol depending on type and level of layer, e.g. as indicated by the OSI model, as understood by the person skilled in the art.

The first communication node 501 may be connected to a core network 507 providing e.g. internet services to the second communication node 503.

It should be appreciated that the network 500 is configured with cabling, routers, switches, and other network building elements (not shown) as understood by the skilled person, for instance as used for building an Ethernet or WAN network.

Figure 6:
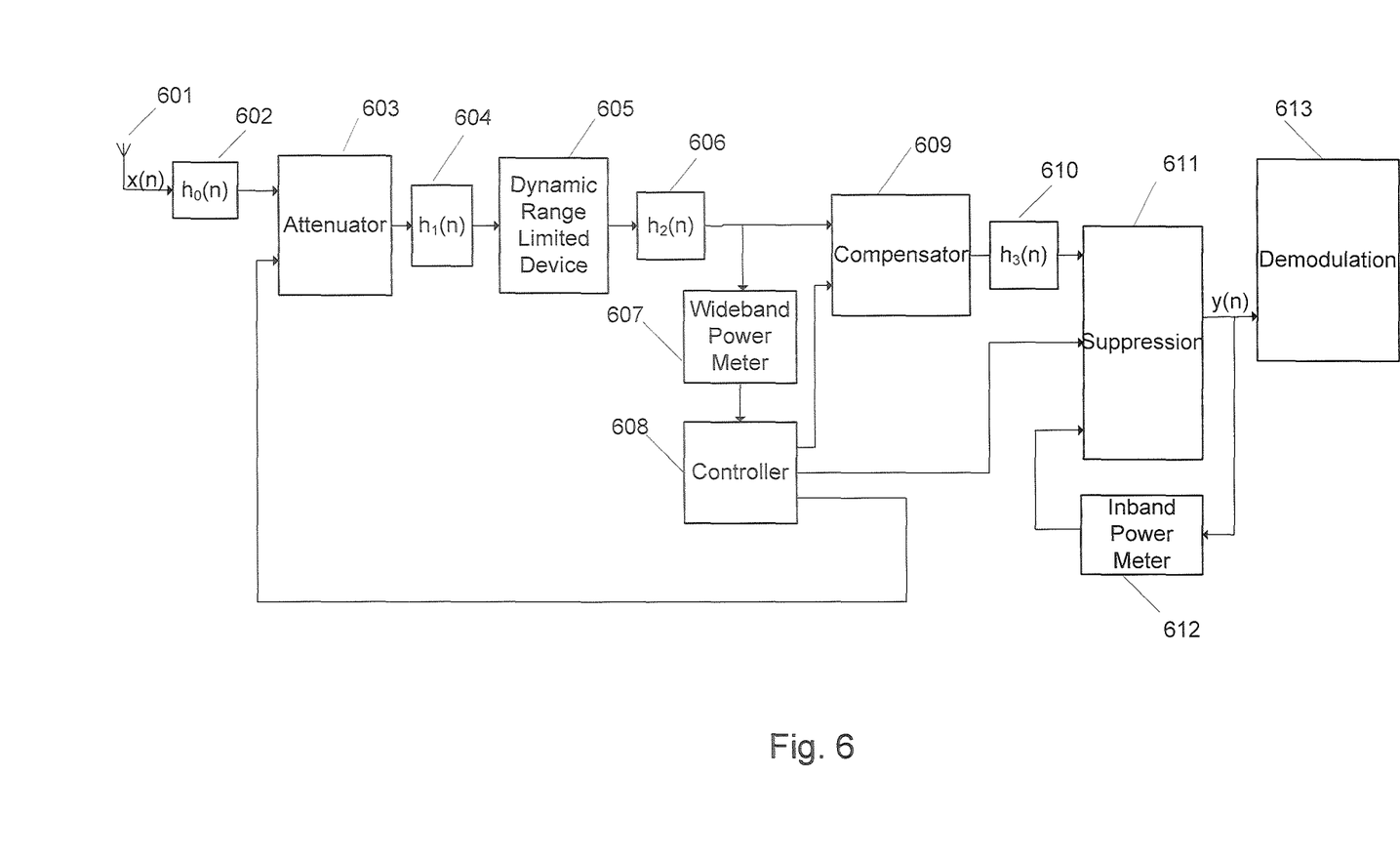
FIG. 6 is a schematic block diagram illustrating embodiments of an AGC receiver architecture.
Figure 7:
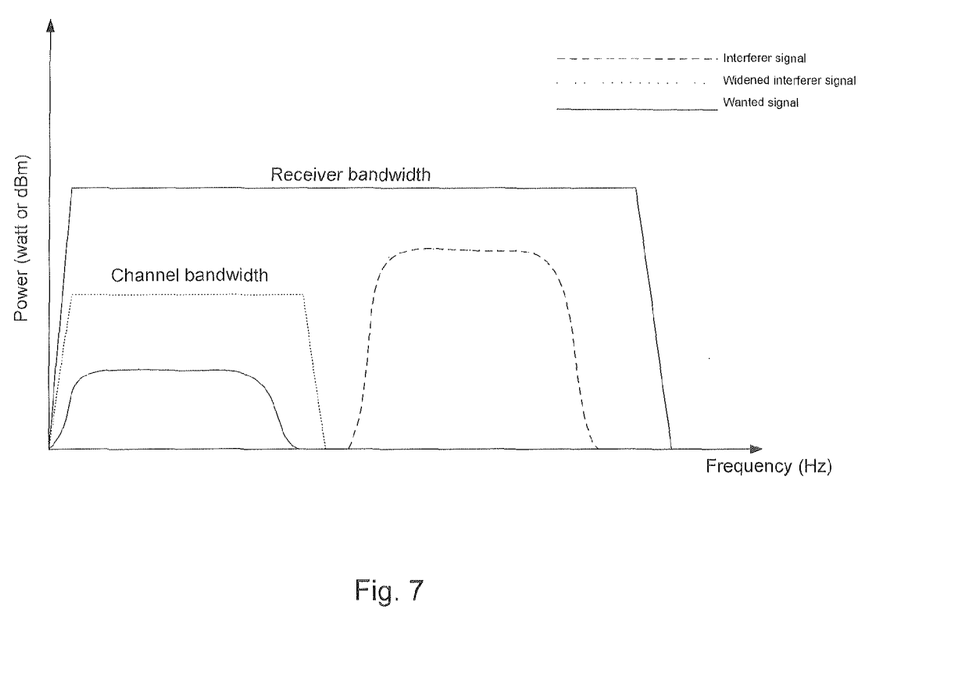
FIG. 7 is a graph illustrating examples of signal spectra.

FIG. 6 is a block diagram illustrating the present solution for extending the AGC receiver with a synchronized noise suppression device. The units 601-610 corresponds to the units 401-410 in FIG. 4, and will therefore not be described again in detail with reference to FIG. 6. The Automatic Gain Control (AGC) receiver illustrated in FIG. 6 operates by redistributing gain around the dynamic range limited device 605 to keep the signal within an operating range. The controller unit 608 monitors the wideband power level, $P_{Wideband}$ measured by the wideband power meter 607, and automatically adjusts the receiver gain through the attenuator 603. During these adjustments, a discontinuity may be generated in the signal. The discontinuity may be distorted in frequency, phase and amplitude by a mismatch between attenuation and compensation. If there is an interferer present it may get widened in spectrum by the discontinuity, generating a noise pulse into the wanted signal. This is illustrated in FIG. 7 which shows examples of the signal spectra. When a discontinuity occurs, the interferer signal may be widened and leak into the wanted signal spectrum.

Figure 8:
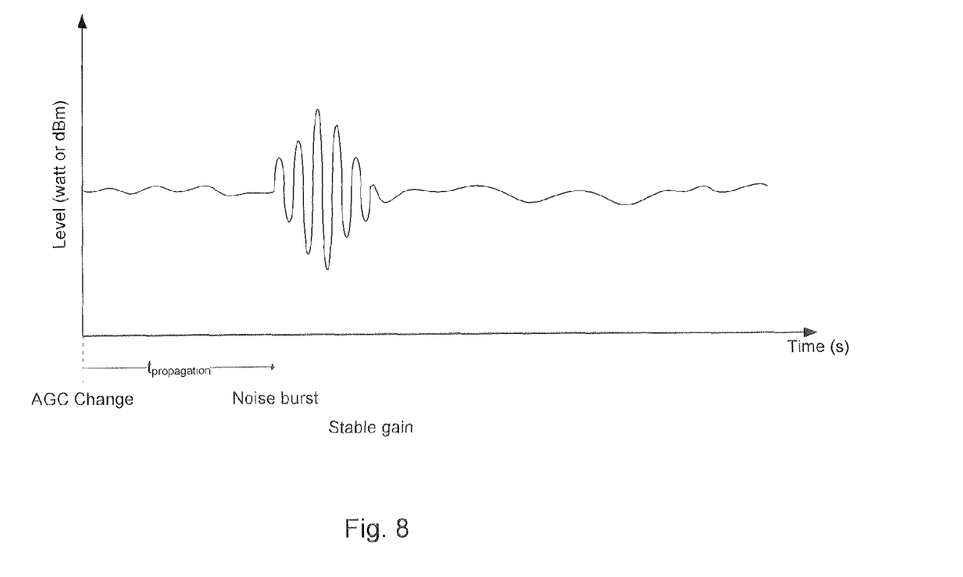
FIG. 8 is a graph illustrating noise burst after AGC switching.

This burst caused by the discontinuity and noise may get widened in time due to the impulse response of the signal processing filters represented by the filters $h_1(n)$, $h_2(n)$ and $h_3(n)$ in FIGS. 4 and 6. Even though the compensator adjusts according to the attenuator 603, the distortion has already been added to the wanted signal. This is illustrated in FIG. 8 showing noise burst after AGC switching.

Figure 9:
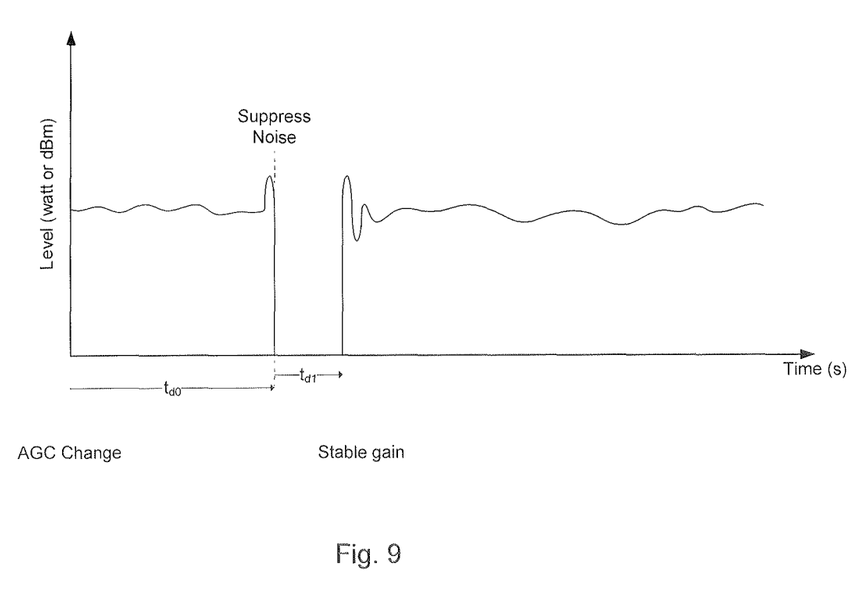
FIG. 9 is a graph illustrating suppression of noise.

The present solution extends the AGC by adding a device to synchronize, through delays, a signal suppression that zeros the signal for part of, or the whole of, the noise burst. This is illustrated in FIG. 9 where noise is suppressed during a part of the noise burst The device also measures the power level within the channel bandwidth, $P_{Inband}$, 612 to determine if the attenuator 603 is triggered by the wanted signal or by the interferer.

Figure 10:
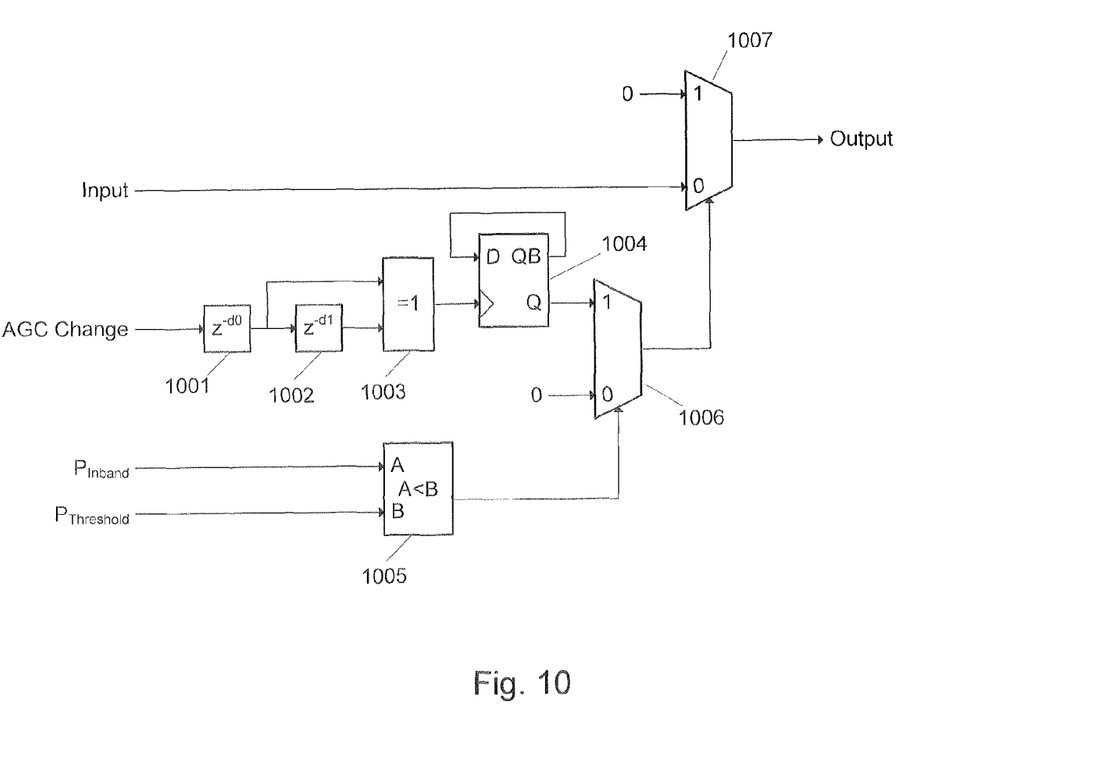
FIG. 10 is a block diagram illustrating embodiments of a synchronized noise suppressor.

FIG. 10 show an example how the synchronized noise suppressor and control may be realized. The delay elements $z^{-d0}$ 1001 and $z^{-d1}$ 1002 and XOR logic 1003 control the start, d0, and duration, d1, of the suppression by toggling a register 1004. The comparator 1005 chooses, by comparing the inband signal, $P_{inband}$, and the threshold, $P_{threshold}$, if suppression shall be used with MUX 1006. Suppression is applied using MUX 1007.

Figure 11:
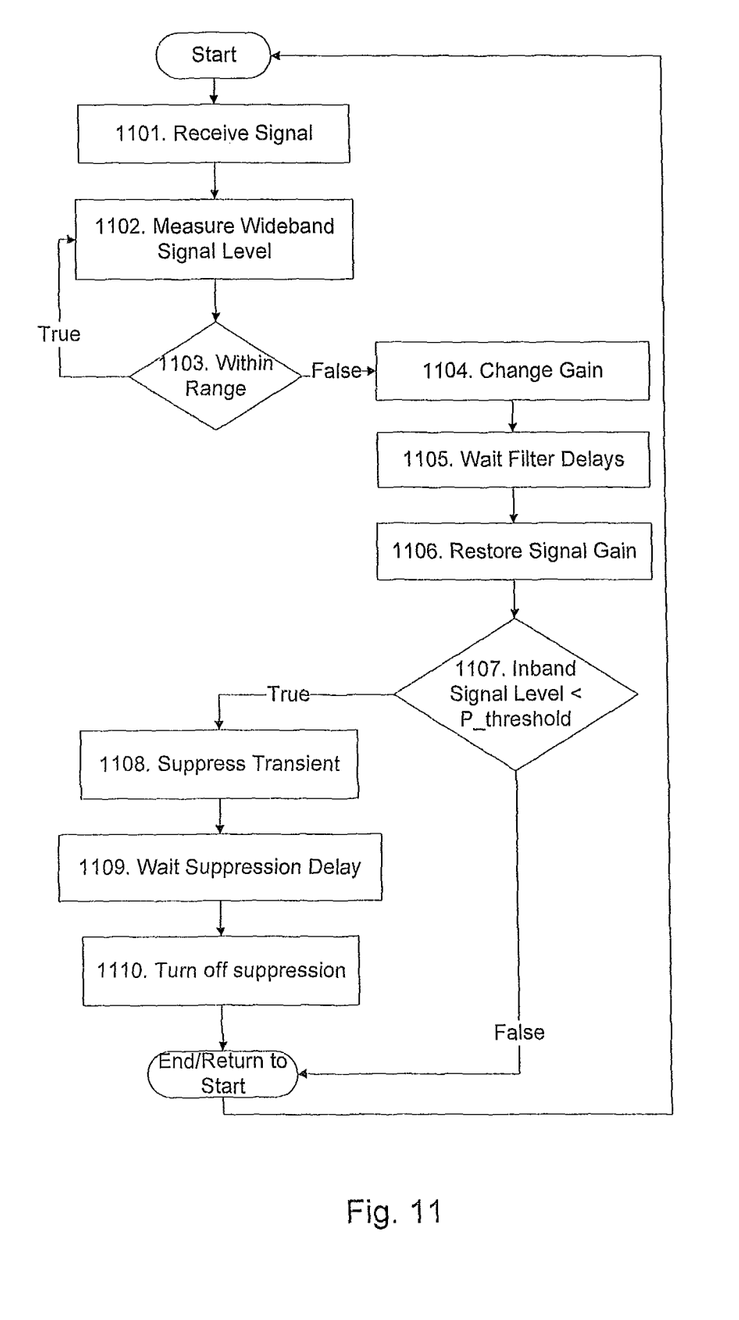
FIG. 11 is a flowchart depicting embodiments of a method in a communications network.
Figure 12:
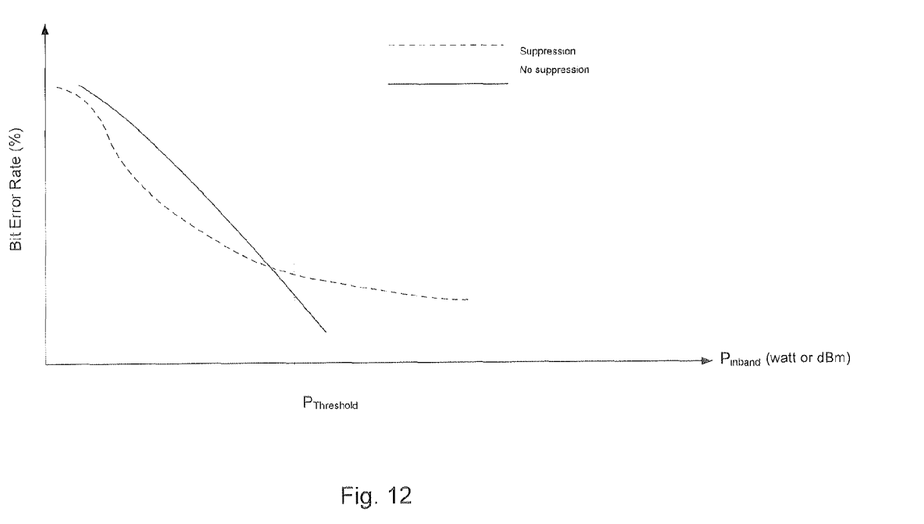
FIG. 12 is a graph illustrating examples of threshold level for inband power.

The present solution method for reducing noise in a wireless communication system according to some embodiments will now be described with reference to flowchart depicted in FIG. 11, with reference to FIG. 5 illustrating embodiments of a communication network, FIG. 6 illustrating embodiments of an AGC receiver architecture and FIG. 12 illustrating example of threshold levels. The method comprises the following steps, which steps may as well be carried out in another suitable order than described below:

Step 1101

The first communication node 501 receives a signal from the second communication node 503 over the communication link 505. The receiver may be a wideband receiver. The signal may be received continuously or when requested by the first communication node 501.

Step 1102

A wideband signal level of the received signal is measured. The wideband signal level is measured by using the wideband power meter 607.

Step 1103

A range of the measured wideband signal level is evaluated by the controller 608. If the wideband signal level is within the range (true), it returns to step 1102. If the wideband signal level is outside the range (false), the method proceeds to step 1104.

Step 1104

A signal gain in an analogue domain is changed based on the evaluated range.

Step 1105

When a change in AGC is initiated in steps 1101-1105, the suppression control signal is delayed for a time equal to the propagation delay of the filter $h_3(n)$ 610.

Step 1106

The signal gain is restored in a digital domain.

Step 1107

An inband signal level in the restored signal gain is measured. The level is measured by the inband power meter 612 placed after the channel filter $h_3(n)$ 610.

The inband signal level is measured with respect to a threshold level, $P_{Threshold}$. The threshold level is set to match the intersection point between the two bit error rate plots shown in FIG. 12. FIG. 12 gives example of threshold level for inband (channel bandwidth) power. These bit error rate plots may be based upon simulations or statistical data. If the level exceeds the threshold (true), the method proceeds to step 1108 where the transient noise in the restored signal is suppressed. If the inband signal level does not exceed the threshold (false), the method proceeds to the start, step 1101. The threshold, $P_{Threshold}$, may be a constant value or a range, and may be based on for instance bit error rate.

Step 1108

The transient noise in the restored signal is suppressed, i.e. the noise is zeroed.

Step 1109

The synchronization is done by delaying the suppressed signal for a time corresponding to the duration of the suppressed signal.

Step 1110

The suppression is turned off. After the suppression is turned off, the method may go back to the start to receive a new signal.

The suppression is disabled when the threshold is exceeded, giving the best performance regarding e.g. bit error rate.

The suppression device shall, when enabled, output a signal corresponding to zero value according in the signal representation. When disabled it shall output the input signal unmodified.

Figure 13:
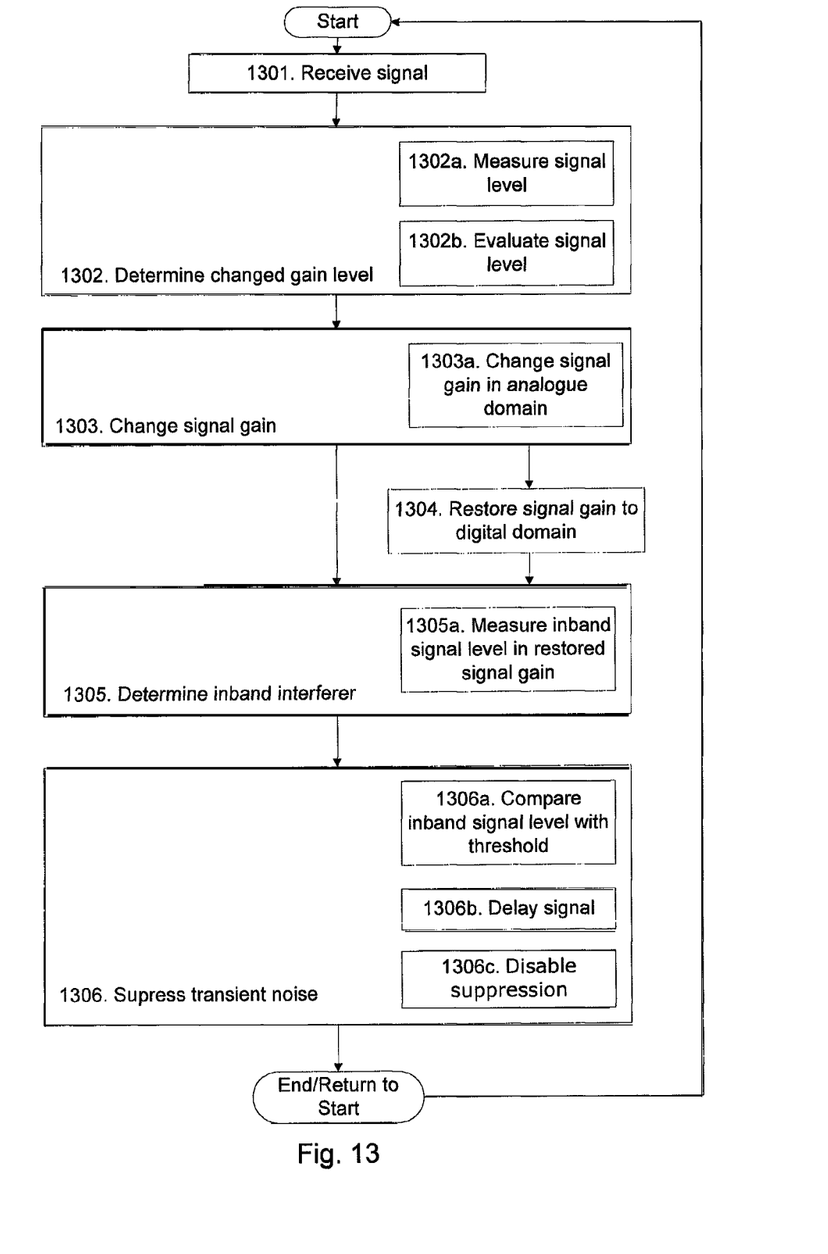
FIG. 13 is a flowchart depicting embodiments of a method in a communications network.

The method described above will now be described seen from the perspective of the first communication node 501. FIG. 13 is a flowchart describing the present method in the first communication node 501 for reducing noise in a communication system 500 utilizing automatic gain control. The first communication node 501 may be a base station and the second communication node 503 may be a user equipment. The method comprises the steps to be performed by the application in the first communication node 501 and which steps may be performed in any suitable order:

Step 1301

The first communication node 501 receives a signal from a second communication node 503.

Step 1302

The first communication node 501 determined if a signal gain level is changed.

Step 1302a

This is an optional step to be performed as a substep of step 1302. The first communication node 501 may measure a wideband signal level of the received signal.

Step 1302b

This is an optional step to be performed as a substep of step 1302. The first communication node 501 may evaluate the measured wideband signal level.

Step 1303

The signal gain is changed.

Step 1303a

This is an optional step to be performed as a substep of step 1303. The first communication node 501 may change the signal gain in an analogue domain.

Step 1304

This is an optional step. The first communication node may restore the signal gain to a digital domain.

Step 1305

The first communication node 501 determines if an inband interferer is present.

Step 1305a

This is an optional step to be performed as a substep of step 1305. The first communication node 501 may measure an inband signal level in the restored signal gain.

Step 1306

The first communication node 501 suppresses transient noise in the signal.

Step 1306a

This is an optional step to be performed as a substep of step 1306. The first communication node 501 may compare the inband signal level with a threshold level.

The comparing may be based on bit error rate.

Step 1306b

This is an optional step to be performed as a substep of step 1306. The first communication node 501 may delay the signal in time. The time may be in correspondence with the duration of the suppressed noise.

Step 1306c

This is an optional step to be performed as a substep of step 1306. The first communication node 501 may disable the suppression.

Figure 14:
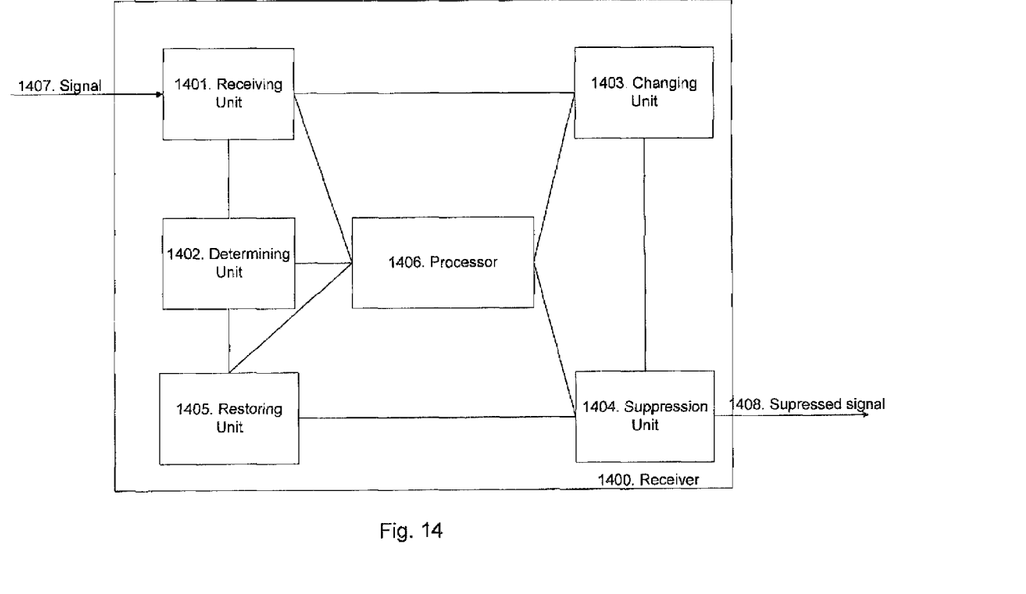
FIG. 14 is a schematic block diagram illustrating embodiments of a receiver.

To perform the method steps shown in FIG. 13 for reducing noise in a communication system 500 utilizing an automatic gain control. The system 500 comprises receiver 1400 in a first communication node as shown in FIG. 14.

The receiver 1400 comprises a receiving unit 1401 configured to receive a signal 1407 from a second communication node 503.

The receiver 1400 also comprises a determining unit 1402 configured to determine if a gain level is changed. The determining unit 1402 is further configured to determine if an inband interferer is present. Further, the determining unit 1402 may be configured to measure a wideband signal level of the received signal, and to evaluate the measured wideband signal level. The determining unit 1402 may be further configured to measure an inband signal level in the restored signal gain.

The receiver 1400 further comprises a changing unit 1403 which is configured to change the signal gain. The changing unit 1403 may be further configured to change the signal gain in an analogue domain.

The receiver 1400 may comprise a restoring unit 1405 which may be configured to restore the signal gain to a digital domain.

The receiver 1400 comprises a suppression unit 1404 configured to suppress transient noise in the signal. The suppression unit 1404 may be further configured to compare the inband signal level with a threshold level. The suppression unit 1404 may even further be configured to delay the signal in time. The time may be in correspondence with the duration of the suppressed noise. The suppression unit 1404 may also be configured to disable the suppression.

The method and receiver 1400 described above will now be described in the perspective of a communication system 500 for reducing noise utilizing an automatic gain control. The system 500 comprises a first communication node 501. The first communication node 501 comprising an antenna configured to receive a signal from a second communication node 503 and the receiver 1400 which configured to suppress transient noise. The first communication node 501 further comprises a demodulator configured to demodulate the signal, a memory configured to store the demodulated signal, and a transmitter configured to transmit the demodulated signal. The wireless communication system may be for instance based on Long Term Evolution (LTE) or Universal Mobile Telecommunications System (UMTS).

The present mechanism for reducing switching noise in a wireless communication system 500 may be implemented through one or more processors, such as a processor 1406 in the receiver 1400 depicted in FIG. 14, together with computer program code for performing the functions of the present solution. The processor may be for example a Digital Signal Processor (DSP), Application Specific Integrated Circuit (ASIC) processor, Field-programmable gate array (FPGA) processor or micro processor. The program code mentioned above may also be provided as a computer program product, for instance in the form of a data carrier carrying computer program code for performing the present solution when being loaded into the first communication node 1400. One such carrier may be in the form of a CD ROM disc. It is however feasible with other data carriers such as a memory stick. The computer program code may furthermore be provided as pure program code on a server and downloaded to the receiver 1400 comprised in the first communication node 501.

It should be noted that the word "comprising" does not exclude the presence of other elements or steps than those listed and the words "a" or "an" preceding an element do not exclude the presence of a plurality of such elements. The invention can at least in part be implemented in either software or hardware. It should further be noted that any reference signs do not limit the scope of the claims, and that several "means", "devices", and "units" may be represented by the same item of hardware.

The above mentioned and described embodiments are only given as examples and should not be limiting to the present invention. Other solutions, uses, objectives, and functions within the scope of the invention as claimed in the below described patent claims should be apparent for the person skilled in the art.

The invention claimed is:

1. A method in a first communication node for suppressing noise in a communication system utilizing an automatic gain control, the method comprising:

receiving, at the first communication node, a signal from a second communication node; and determining if a gain level of the received signal is changed, wherein the step of determining if the gain level is changed comprises: measuring a wideband signal level of the received signal evaluating if the measured wideband signal level is outside a range;

changing the signal gain if the evaluated signal level is outside the range;

determining if an inband interferer is present;

suppressing, using a suppression unit, transient noise in the signal if the inband interferer is present; and disabling the suppressing.

2. The method according to claim 1, wherein the step of changing the signal gain changing the signal gain in an analogue domain; and the method further comprises the step of: restoring the signal gain to a digital domain.

3. The method according to claim 2, wherein the step of determining the presence of an inband interferer comprises measuring an inband signal level in the restored signal gain.

4. The method according to claim 3, wherein the step of suppressing transient noise comprises: comparing the inband signal level with a threshold level.

5. The method according to claim 4, wherein the comparing is based on bit error rate.

6. The method according to claim 1, wherein the step of suppressing transient noise comprises: delaying the signal in time, wherein the time is in correspondence with a duration of the suppressed noise.

7. A receiver in a first communication node for suppressing noise in a communication system utilizing an automatic gain control, the receiver comprising:

a receiving unit configured to receive a signal from a second communication node;

a determining unit configured to: determine if a gain level in the received signal is changed; measure a wideband signal level of the received signal; evaluate if the measured wideband signal is outside a range, and determine if an inband interferer is present;

a changing unit configured to change the signal gain if the evaluated signal level is outside the range; and a suppression unit configured to suppress transient noise in the signal if the inband interferer is present and to disable the suppression.

8. The receiver according to claim 7, wherein the changing unit is further configured to change the signal gain in an analogue domain; and wherein the receiver further comprises a restoring unit configured to restore the signal gain to a digital domain.

9. The receiver according to claim 8, wherein the determining unit is further configured to measure an inband signal level in the restored signal gain.

10. The receiver according to claim 9, wherein the suppression unit is further configured to compare the inband signal level with a threshold level.

11. The receiver according to claim 7, wherein the suppression unit is further configured to delay the signal in time, wherein the time is in correspondence with the duration of the suppressed noise.

* * * * *

UNITED STATES PATENT AND TRADEMARK OFFICE
CERTIFICATE OF CORRECTION

PATENT NO.       : 8,582,700 B2
APPLICATION NO.  : 13/202847
DATED            : November 12, 2013
INVENTOR(S)      : Hagen et al.

It is certified that error appears in the above-identified patent and that said Letters Patent is hereby corrected as shown below:

Title Page, Item (75), under "Inventors", in Column 1, Line 2, delete "Bjork," and insert -- Björk, --, therefor.

Title Page, Item (75), under "Inventors", in Column 1, Line 2, delete "Goteborg (SE);" and insert -- Göteborg (SE); --, therefor.

In the Claims

In Column 8, Line 1, in Claim 1, delete "signal" and insert -- signal and --, therefor.

In Column 8, Line 2, in Claim 1, delete "range:" and insert -- range; --, therefor.

In Column 8, Line 10, in Claim 2, delete "gain" and insert -- gain comprises --, therefor.

Signed and Sealed this
Twenty-ninth Day of April, 2014

Michelle K. Lee
*Deputy Director of the United States Patent and Trademark Office*